(12) United States Patent
Zhang

(10) Patent No.: US 11,643,127 B2
(45) Date of Patent: May 9, 2023

(54) CHILD STROLLER APPARATUS

(71) Applicant: Wonderland Switzerland AG, Steinhausen (CH)

(72) Inventor: Xiaojian Zhang, Dongguan (CN)

(73) Assignee: Wonderland Switzerland AG, Steinhausen (CH)

( * ) Notice: Subject to any disclaimer, the term of this patent is extended or adjusted under 35 U.S.C. 154(b) by 110 days.

(21) Appl. No.: 17/378,478

(22) Filed: Jul. 16, 2021

(65) Prior Publication Data

US 2021/0339784 A1 Nov. 4, 2021

Related U.S. Application Data

(63) Continuation of application No. 16/752,279, filed on Jan. 24, 2020, now Pat. No. 11,091,186.

(30) Foreign Application Priority Data

Jan. 29, 2019 (CN) .......................... 201910086654.3

(51) Int. Cl.
*B62B 7/06* (2006.01)
*B62B 9/10* (2006.01)

(52) U.S. Cl.
CPC .............. *B62B 7/062* (2013.01); *B62B 9/102* (2013.01); *B62B 9/104* (2013.01)

(58) Field of Classification Search
CPC .......... B62B 7/062; B62B 9/102; B62B 9/104
See application file for complete search history.

(56) References Cited

U.S. PATENT DOCUMENTS

| | | | |
|---|---|---|---|
| 2010/0244408 A1* | 9/2010 | Dean | B62B 7/142 403/103 |
| 2011/0012324 A1* | 1/2011 | Yeh | B62B 9/104 280/639 |
| 2011/0241313 A1* | 10/2011 | Homan | B62B 7/142 280/647 |
| 2015/0259005 A1* | 9/2015 | Driessen | B62B 9/12 297/321 |
| 2018/0027989 A1* | 2/2018 | Pos | B62B 7/006 |
| 2019/0256120 A1* | 8/2019 | Oakes | B62B 7/142 |
| 2019/0320812 A1* | 10/2019 | Zhong | B62B 9/12 |
| 2019/0320814 A1* | 10/2019 | Zhong | A47D 1/002 |
| 2019/0322304 A1* | 10/2019 | Zhong | B62B 7/142 |
| 2020/0239058 A1* | 7/2020 | Zhang | B62B 7/142 |

* cited by examiner

*Primary Examiner* — Erez Gurari
(74) *Attorney, Agent, or Firm* — Nz Carr Law Office PLLC

(57) ABSTRACT

A child stroller apparatus includes a stroller frame and a stroller seat. The stroller seat includes a backrest portion fixedly connected with a first joining part, a seat portion fixedly connected with a second joining part that is pivotally connected with the first joining part, a coupling part pivotally connected with the second joining part at a side thereof opposite to that of the first joining part and adapted to connect with the stroller frame, a latch movable between a locking position engaged with the coupling part and an unlocking position disengaged from the coupling part, and a linking mechanism configured to movably couple the latch to the first joining part so that the backrest portion is rotatable in a folding direction to cause the latch to disengage from the coupling part and in an unfolding direction to cause the latch to engage with the coupling part.

24 Claims, 20 Drawing Sheets

CHILD STROLLER APPARATUS

CROSS-REFERENCE TO RELATED APPLICATION(S)

This application is a continuation application of U.S. patent application Ser. No. 16/752,279 filed on Jan. 24, 2020, which claims priority to Chinese patent application no. 201910086654.3 filed on Jan. 29, 2019.

BACKGROUND

1. Field of the Invention

The present invention relates to child stroller apparatuses.

2. Description of the Related Art

A child stroller apparatus generally includes a stroller frame, and a seat including a seat portion and a backrest portion. When the child stroller apparatus is to be stored or transported, the stroller frame usually can be collapsed into a compact form with the seat folding along with the stroller frame. However, it may be desirable in certain situation to fold only the seat whereas the stroller frame is kept in an unfolded state, which cannot be achieved with the aforementioned child stroller apparatus.

Moreover, some existing child stroller apparatuses may have the ability to change the orientation of the seat on the stroller frame, but has an overall folded size that is different depending on whether the seat is installed in a forward facing position or a rearward facing position. As a result, a caregiver would need to place the seat in the correct position before folding the child stroller apparatus to obtain a smaller folded size, which may be cumbersome and not desirable.

Therefore, there is a need for an improved child stroller apparatus that can be more flexible in use and address at least the foregoing issues.

SUMMARY

The present application describes a child stroller apparatus.

According to an embodiment, the child stroller apparatus includes a stroller frame, and a stroller seat supportable by the stroller frame. The stroller seat includes a backrest portion fixedly connected with a first joining part, a seat portion fixedly connected with a second joining part that is pivotally connected with the first joining part, a coupling part pivotally connected with the second joining part with the second joining part disposed between the first joining part and the coupling part, the coupling part being adapted to connect with the stroller frame, a latch and a linking mechanism. The latch is carried with the second joining part and is movable between a locking position where the latch is engaged with the coupling part to prevent rotation of the seat portion relative to the coupling part and an unlocking position where the latch is disengaged from the coupling part for rotation of the seat portion relative to the coupling part. The linking mechanism is configured to movably couple the latch to the first joining part so that a rotation of the backrest portion relative to the seat portion in a folding direction causes the latch to disengage from the coupling part, and a rotation of the backrest portion relative to the seat portion in an unfolding direction causes the latch to engage with the coupling part.

According to another embodiment, the child stroller apparatus includes a stroller frame, and a stroller seat supportable by the stroller frame. The stroller seat includes a backrest portion fixedly connected with a first joining part, a seat portion fixedly connected with a second joining part that is pivotally connected with the first joining part, a coupling part pivotally connected with the second joining part and adapted to connect with the stroller frame, a latch and a linking mechanism. The latch is slidable along an axis of movement between a locking position that prevents rotation of the seat portion relative to the coupling part, and an unlocking position for rotation of the seat portion relative to the coupling part. The linking mechanism is configured to movably couple the latch to the first joining part so that a rotation of the backrest portion relative to the seat portion in a folding direction causes the latch to move from the locking position to the unlocking position, and a rotation of the backrest portion relative to the seat portion in an unfolding direction causes the latch to move from the unlocking position to the locking position, wherein the linking mechanism includes a driving part that is connected with the latch and movably coupled to the first joining part of the backrest portion, the driving part being slidable along an axis that differs from the axis of movement of the latch.

According to yet another embodiment, the child stroller apparatus includes a stroller frame, and a stroller seat supportable by the stroller frame. The stroller seat includes a backrest portion fixedly connected with a first joining part, a seat portion fixedly connected with a second joining part that is pivotally connected with the first joining part, a coupling part pivotally connected with the second joining part and adapted to connect with the stroller frame, the seat portion being rotatable relative to the coupling part toward a collapse configuration, a latch and an impeding part. The latch is movable between a locking position that prevents rotation of the seat portion relative to the coupling part and an unlocking position for rotation of the seat portion relative to the coupling part. The impeding part is operable independent of the latch to resist against a rotation of the seat portion relative to the coupling part toward the collapse configuration while the latch is in the unlocking position.

Advantages of the child stroller apparatus provided herein include the ability to offer more flexibility by allowing folding and collapsing of a stroller seat to a compact form while the stroller frame supporting the stroller seat remains in an unfolded state. Moreover, the stroller seat can have a collapse configuration relative to the coupling part that can similarly offer a compact form for storage and transport when the stroller seat is installed in a forward facing position or a rearward facing position on the stroller frame.

DETAILED DESCRIPTION OF THE EMBODIMENTS

Figure 1:
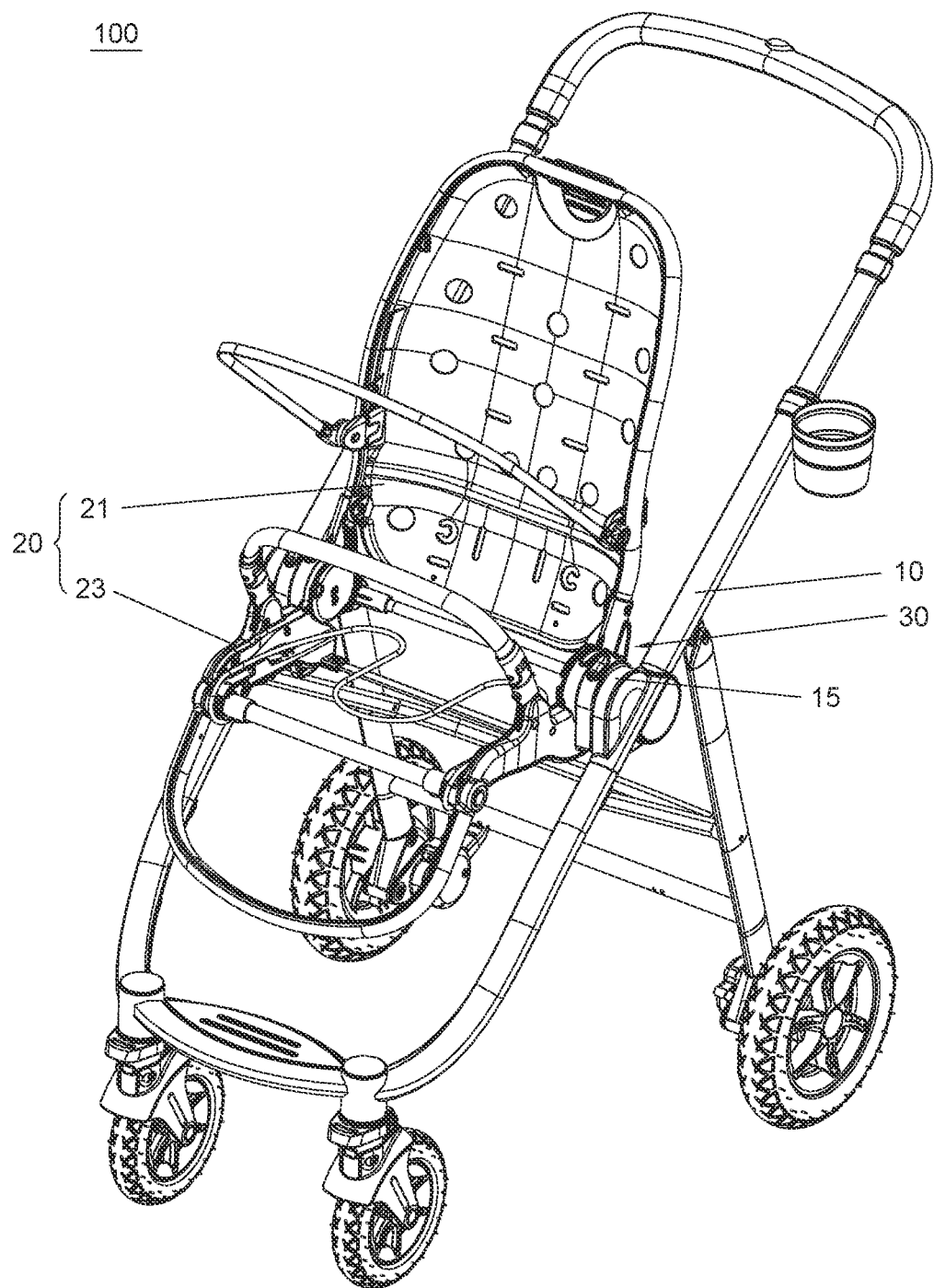
FIG. 1 is a perspective view illustrating an embodiment of a child stroller apparatus.

FIG. 1 is a perspective view illustrating an embodiment of a child stroller apparatus 100. Referring to FIG. 1, the child stroller apparatus 100 includes a stroller frame 10, and a stroller seat 20 supportable by the stroller frame 10. The stroller frame 10 can include a plurality of wheels for facilitating transport of a child. The stroller seat 20 includes a backrest portion 21, a seat portion 23 and a pivot joint 30. The backrest portion 21 and the seat portion 23 are pivotally connected with each other via the pivot joint 30, whereby the backrest portion 21 can rotate relative to the seat portion 23 for folding and unfolding the stroller seat 20.

In conjunction with FIG. 1, FIGS. 2-14 are various views illustrating construction details of the stroller seat 20. Referring to FIGS. 1-14, the stroller seat 20 can be connected with the stroller frame 10 at the pivot joint 30. According to an embodiment, the pivot joint 30 may be configured to detachably couple to the stroller frame 10, whereby the stroller seat 20 can be installed on and removed from the stroller frame 10 as desired. For example, the stroller frame 10 may include a seat mount 15 that can engage with the pivot joint 30 when the stroller seat 20 is installed on the stroller frame 10 and disengage from the pivot joint 30 when the stroller seat 20 is removed from the stroller frame 10. The pivot joint 30 may engage with the seat mount 15 in different orientations so that the stroller seat 20 can be installed in a forward facing position or a rearward facing position on the stroller frame 10.

Figure 2:
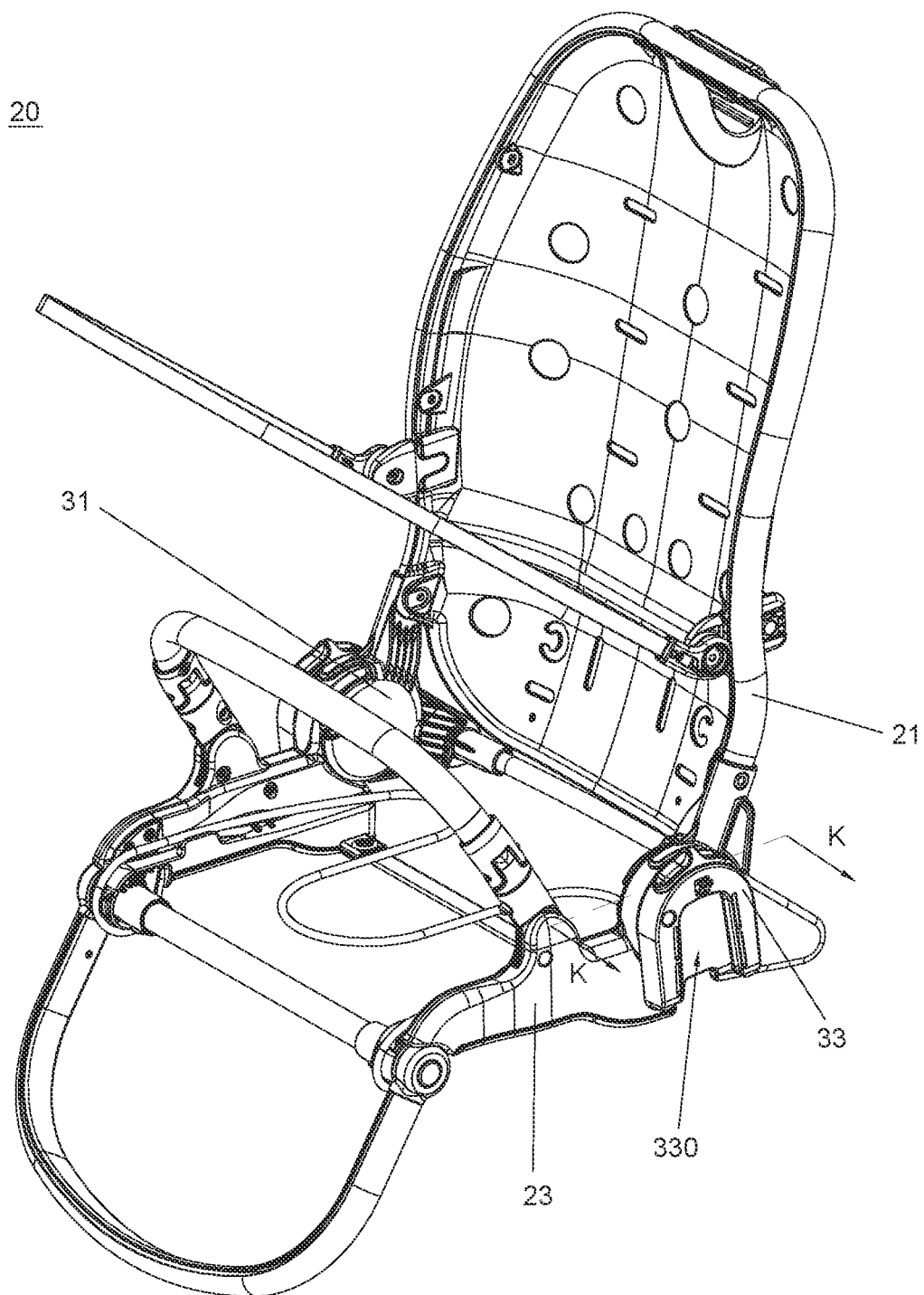
FIG. 2 is a perspective view illustrating a stroller seat provided in the child stroller apparatus.
Figure 3:
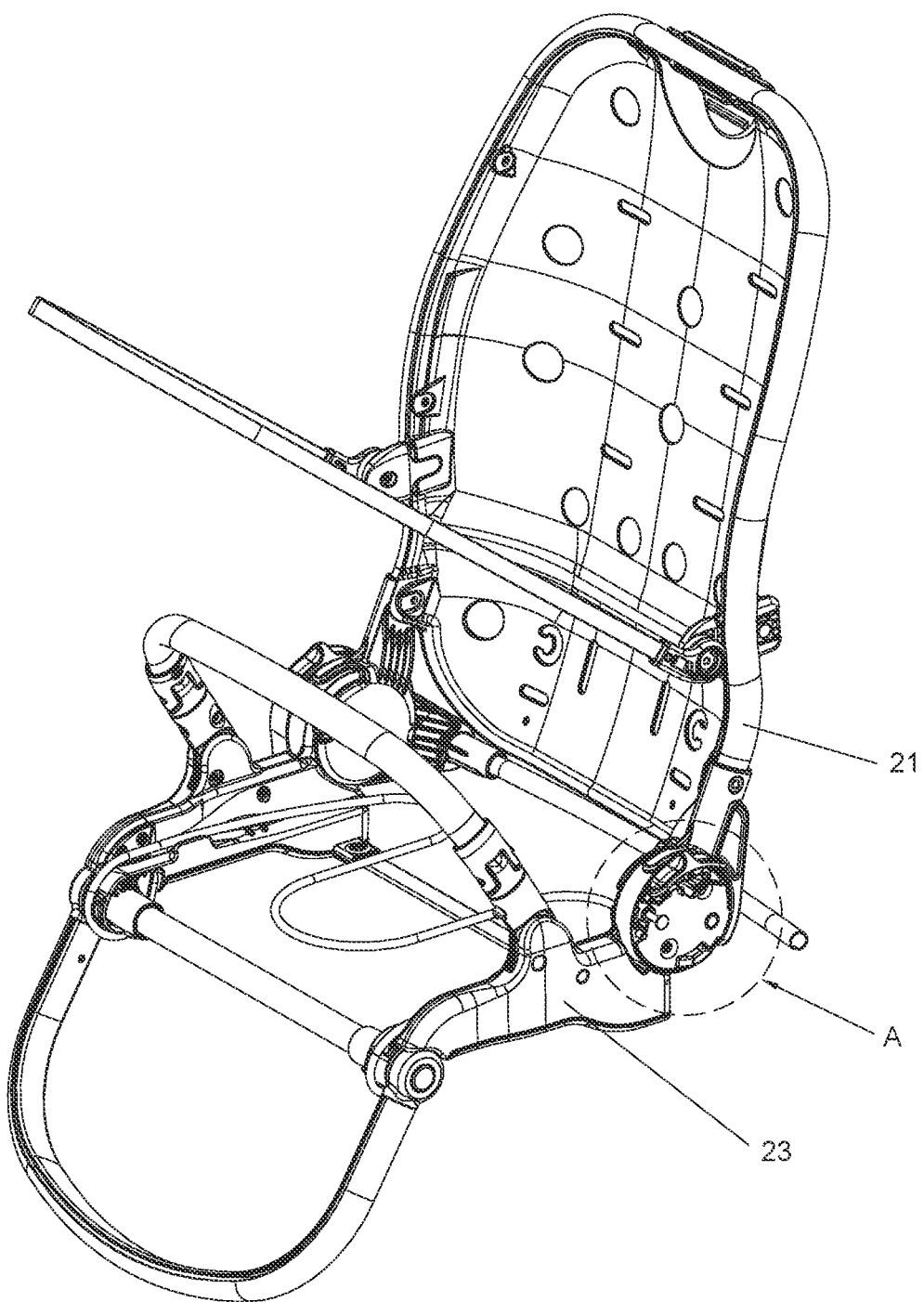
FIG. 3 is a perspective view illustrating the stroller seat of FIG. 2 omitting a coupling part used for coupling the stroller seat to the stroller frame.
Figure 4:
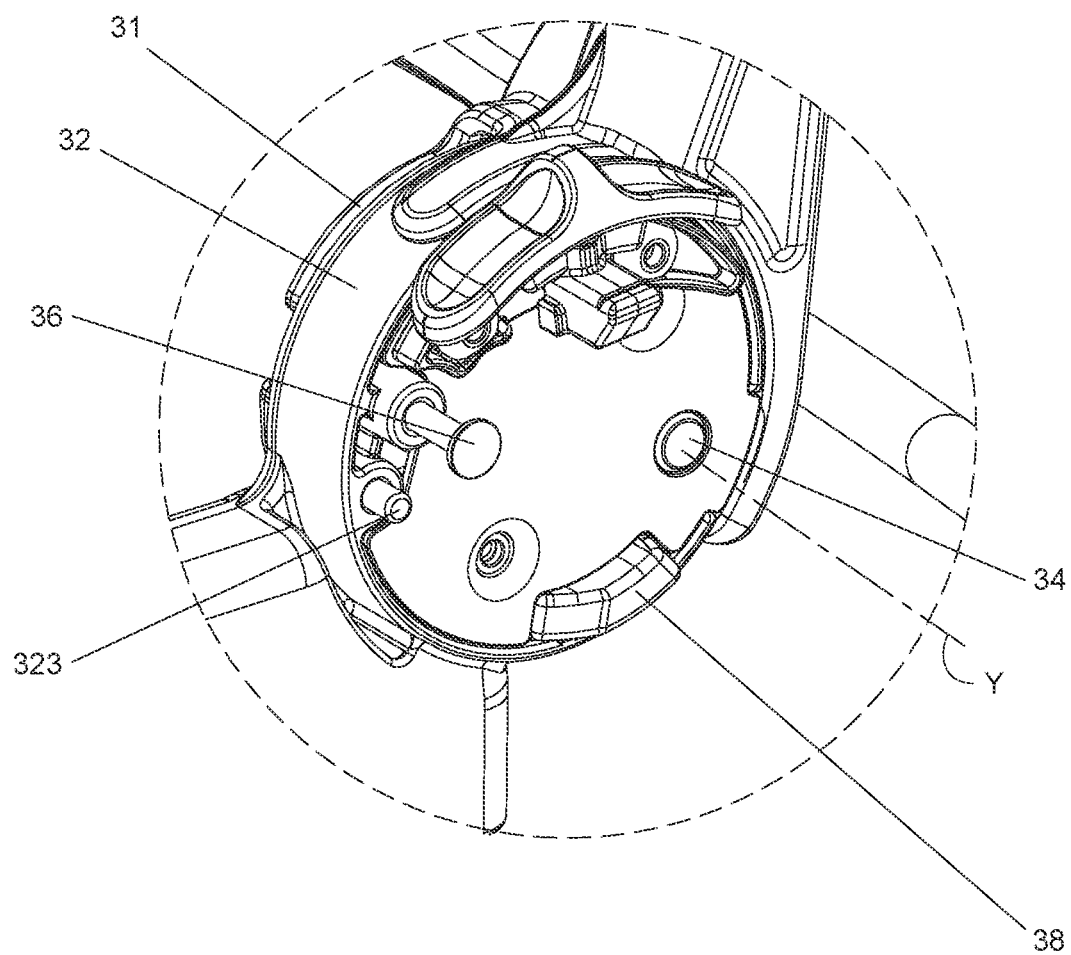
FIG. 4 is an enlarged view of portion A shown in FIG. 3.

Referring to FIGS. 2-4, the pivot joint 30 can include a first joining part 31 fixedly connected with the backrest portion 21, a second joining part 32 fixedly connected with the seat portion 23 that is pivotally connected with the first joining part 31, and a coupling part 33 pivotally connected with the second joining part 32, the second joining part 32 being disposed between the first joining part 31 and the coupling part 33. According to an example of construction, the first joining part 31 and the second joining part 32 may be respectively fastened to the backrest portion 21 and the seat portion 23. For example, the first joining part 31 and the second joining parts 32 may exemplarily include plastic shells respectively fastened to the backrest portion 21 and the seat portion 23. According to another example of construction, the first joining part 31 and the second joining part 32 may be respectively formed integrally with the backrest portion 21 and the seat portion 23.

Referring to FIGS. 1 and 2, the coupling part 33 is adapted to engage with the seat mount 15 when the stroller seat 20 is assembled with the stroller frame 10 and disengage from the seat mount 15 when the stroller seat 20 is removed from the stroller frame 10. For example, the coupling part 33 may include a receiving slot 330, and the seat mount 15 may engage with the receiving slot 330 of the coupling part 33 when the stroller seat 20 is assembled with the stroller frame 10. According to an example of construction, the coupling part 33 may include a plastic housing.

The second joining part 32 is respectively connected pivotally with the first joining part 31 and the coupling part 33, whereby the first joining part 31 and the coupling part 33 may rotate independently of each other relative to the second joining part 32. According to an example of construction, the second joining part 32 and the coupling part 33 can be pivotally connected with each other via a pivot axle 36 that is eccentric from a pivot axle (not shown) that pivotally connects the first joining part 31 with the second joining part 32. It will be appreciated, however, that other placements of the pivot axle 36 may be possible.

Figure 15:
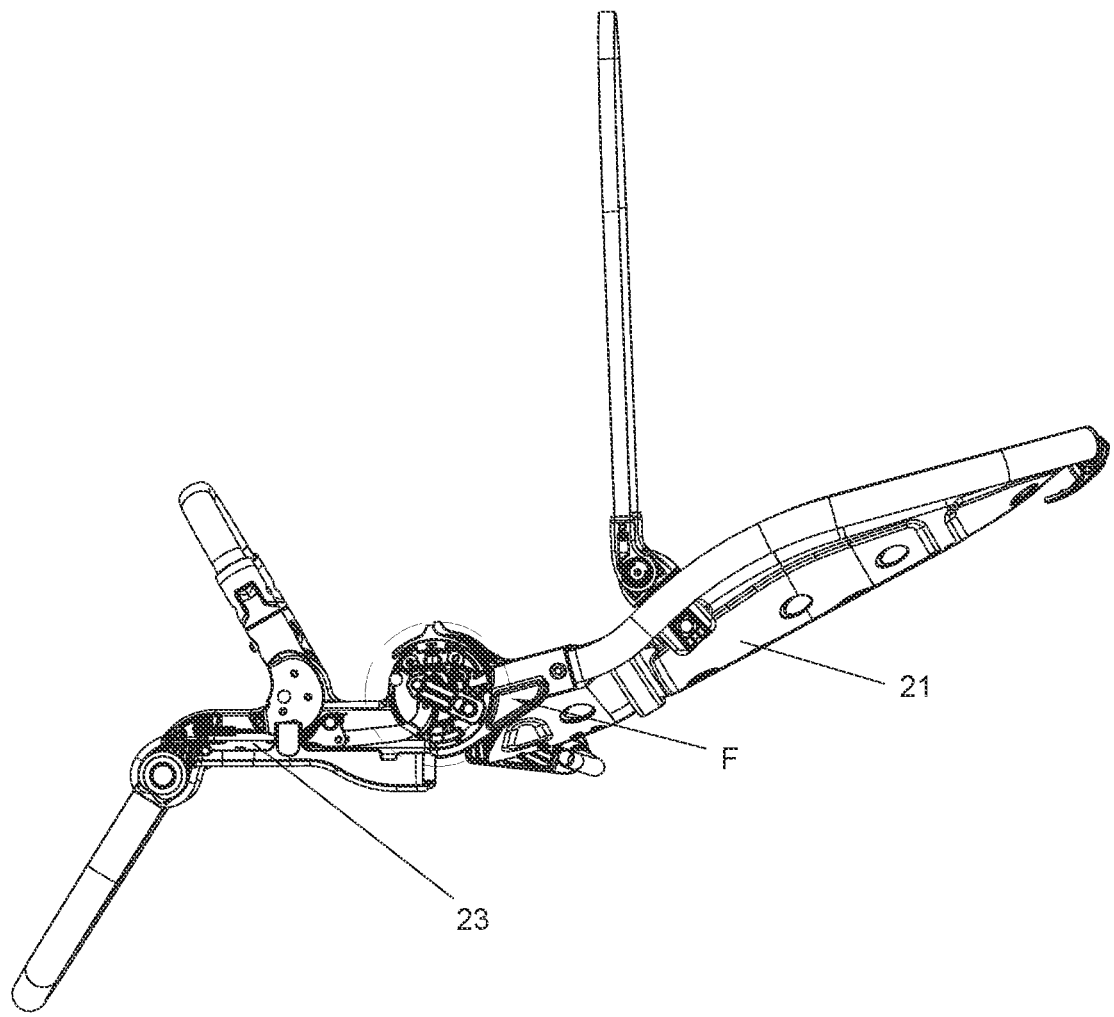
FIG. 15 is a side view illustrating the stroller seat in a recumbent configuration.
Figure 16:
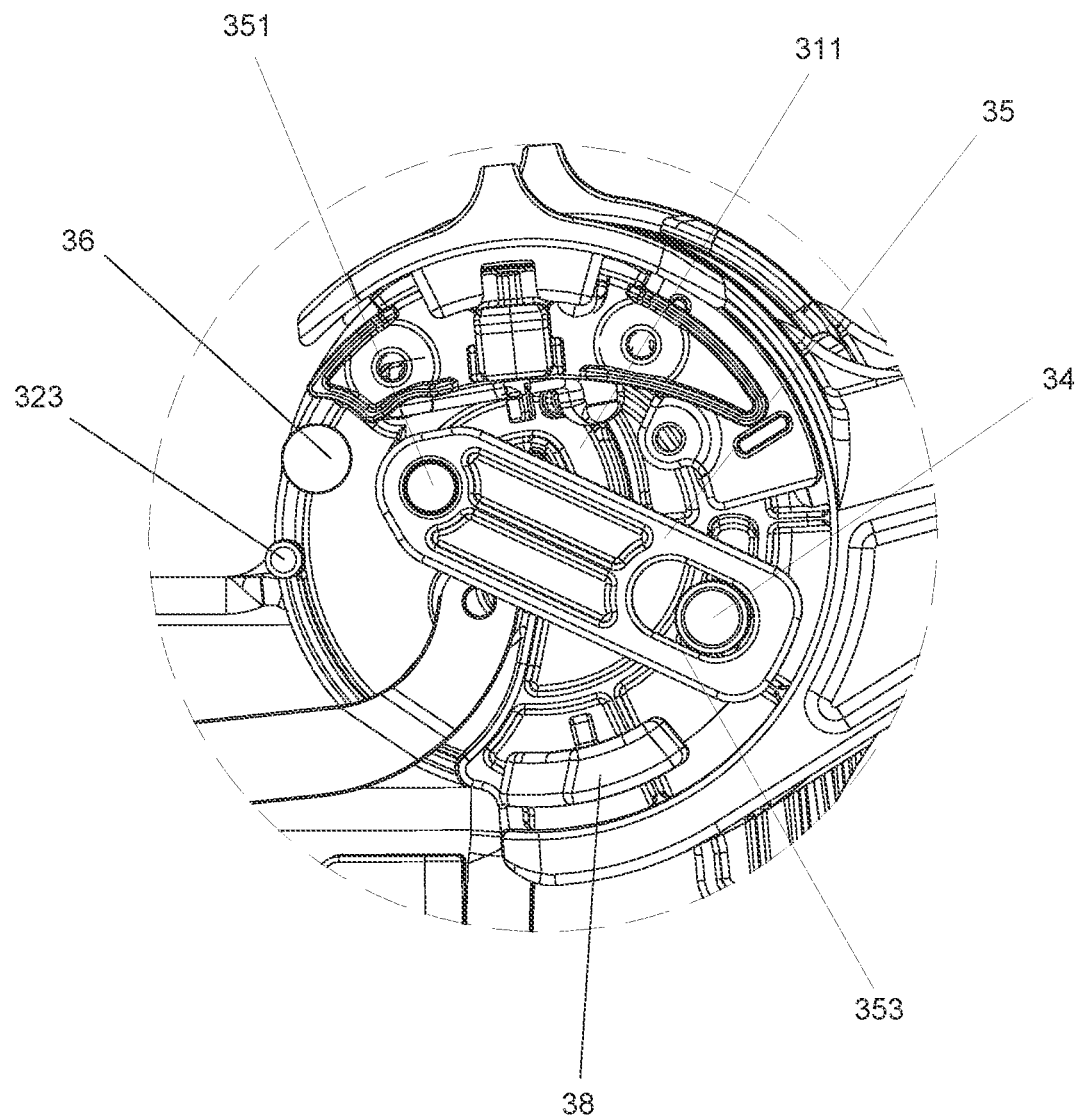
FIG. 16 is an enlarged view of portion F shown in FIG. 15.
Figure 17:
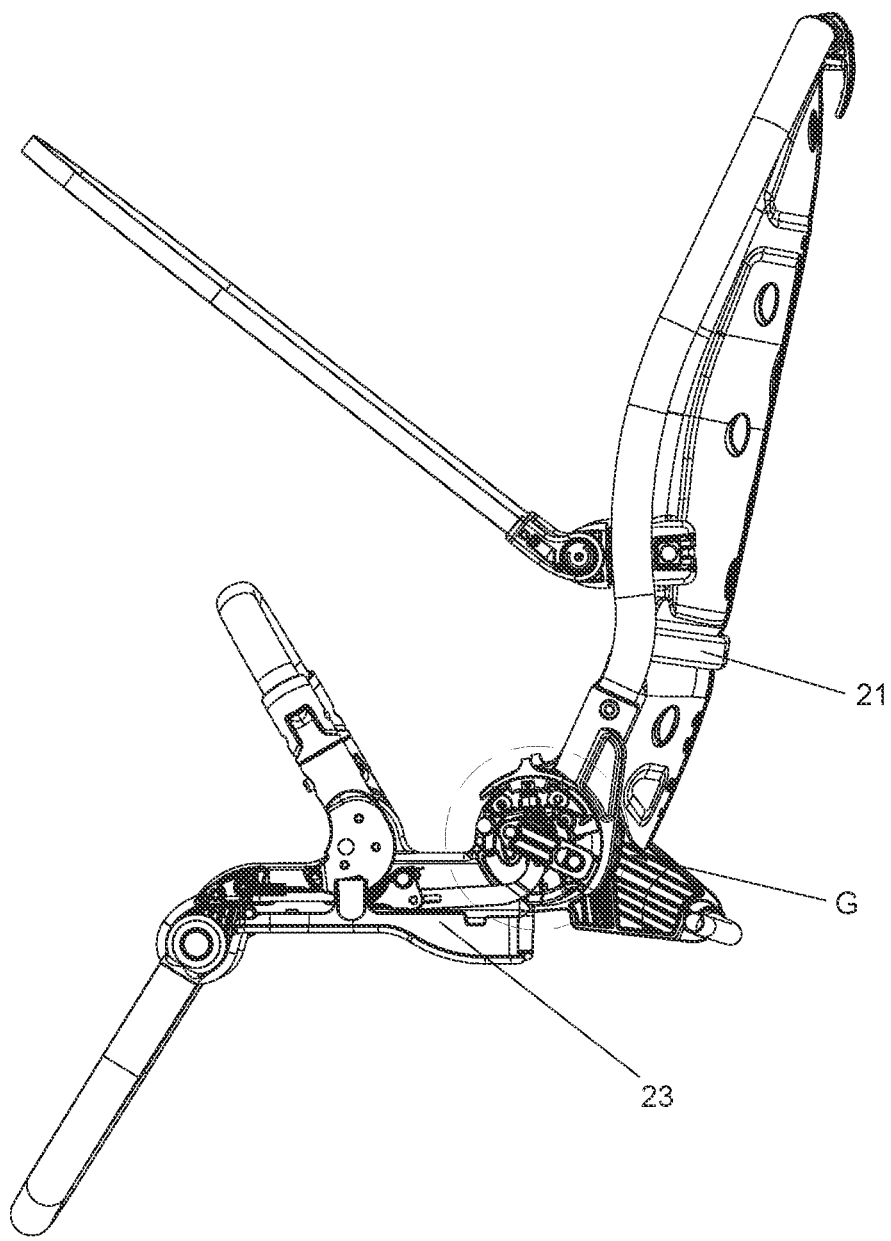
FIG. 17 is a side view illustrating the stroller seat in a sitting configuration.
Figure 18:
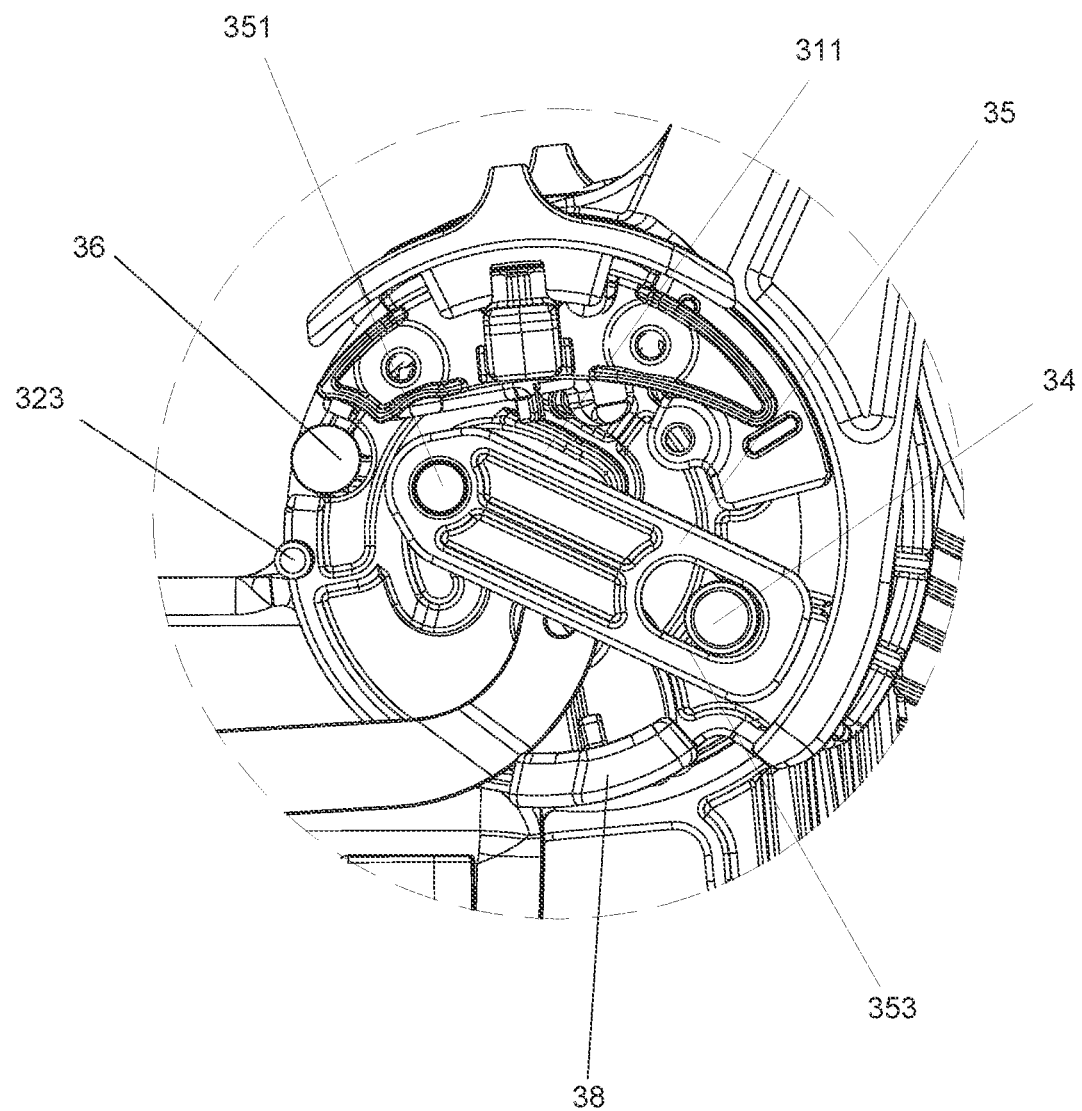
FIG. 18 is an enlarged view of portion G shown in FIG. 17.
Figure 19:
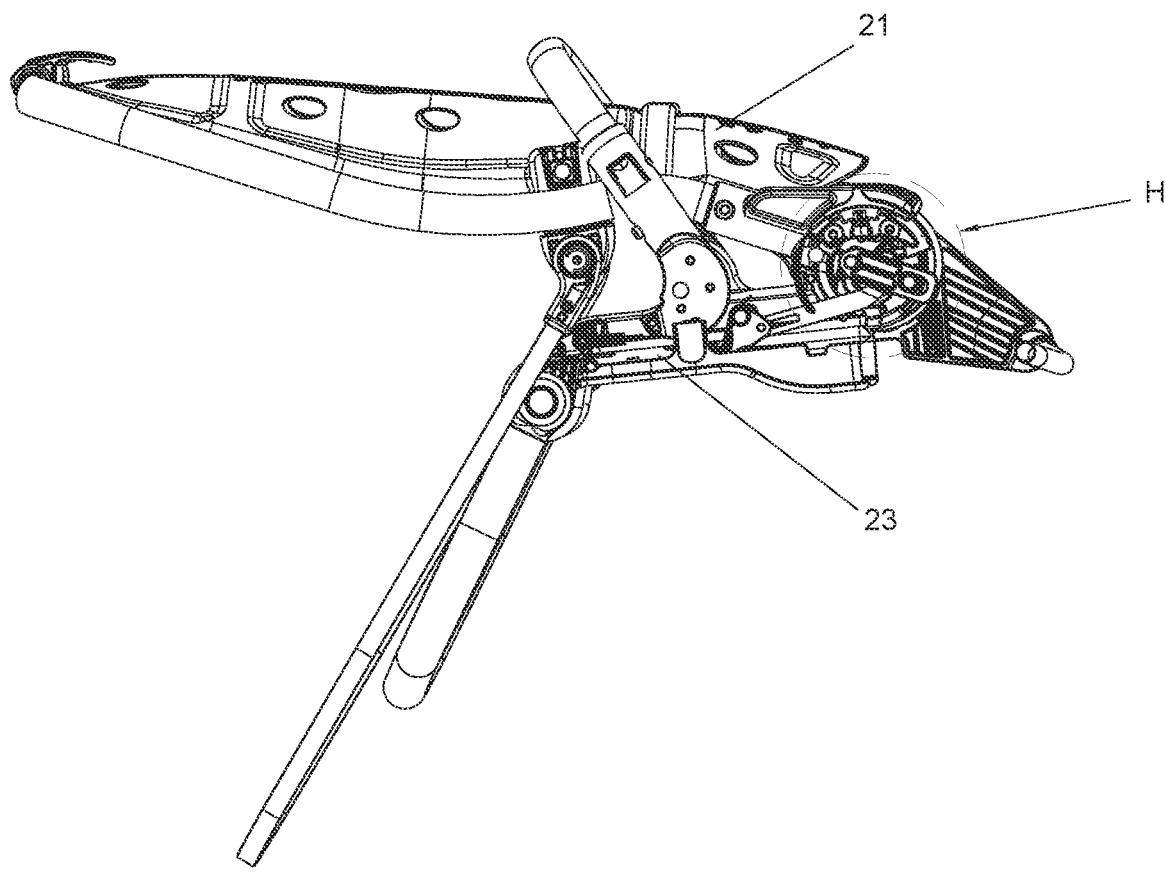
FIG. 19 is a side view illustrating the stroller seat in a folded configuration.
Figure 20:
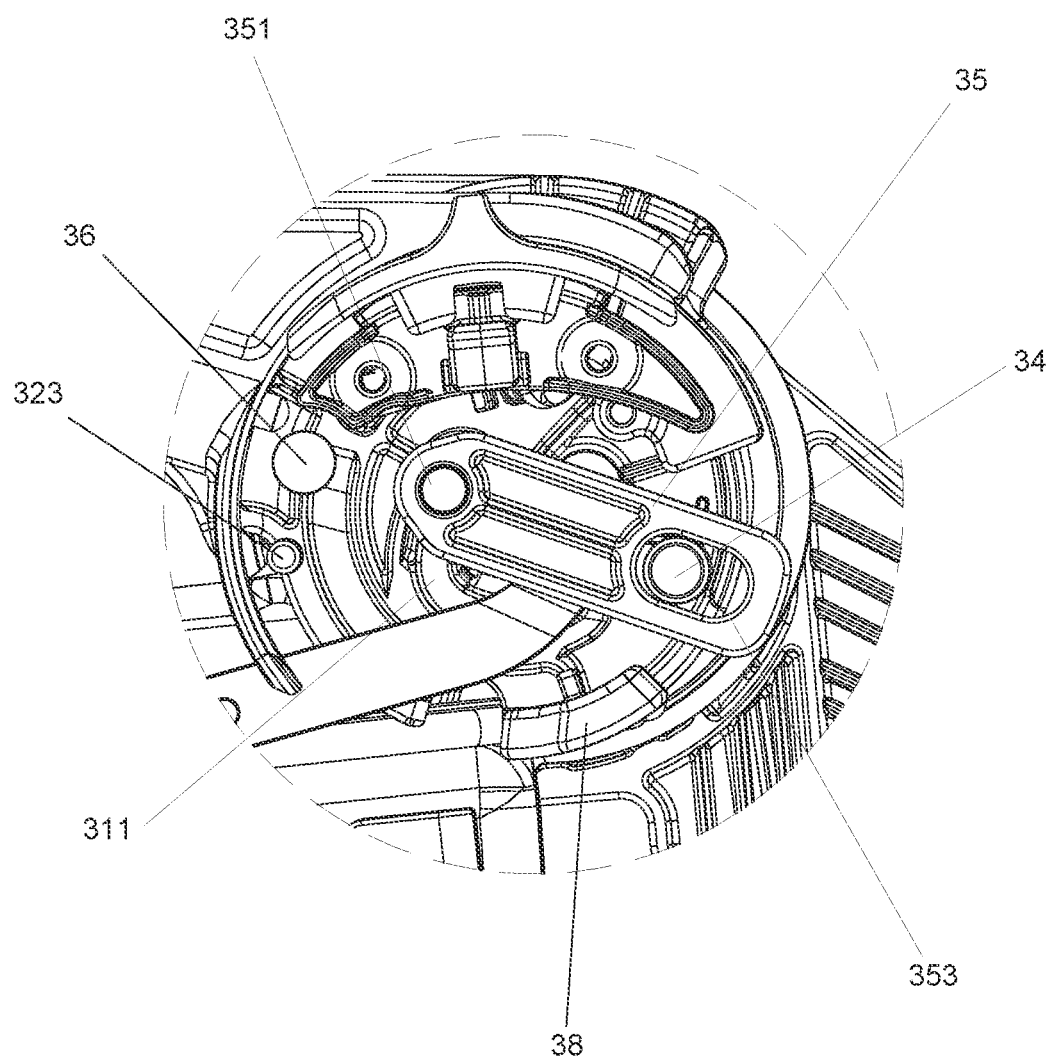
FIG. 20 is an enlarged view of portion H shown in FIG. 19.

With the aforementioned construction, the backrest portion 21 can rotate relative to the seat portion 23 and the coupling part 33 for adjustment of the stroller seat 20 between different configurations. For example, FIGS. 17 and 18 illustrate a sitting configuration of use where the backrest portion 21 is in a first angular position relative to the seat portion 23 suitable for receiving a child in a sitting position. FIGS. 15 and 16 illustrate a recumbent configuration of use where the backrest portion 21 is in a second angular position recline rearward relative to the first angular position for receiving a child lying generally horizontally. FIGS. 19 and 20 illustrate a folded configuration where the backrest portion 21 is in a third angular position folded over the seat portion 23.

Moreover, both the backrest portion 21 and the seat portion 23 can rotate relative to the coupling part 33 for collapsing the folded stroller seat 20 on the stroller frame 10. For example, the seat portion 23 with the backrest portion 21 folded thereon as shown in FIG. 19 can rotate downward as a unit relative to the coupling part 33 toward the interior of the stroller frame 10 so that the child stroller apparatus 100 can be more compact for facilitating storage or transport.

Figure 5:
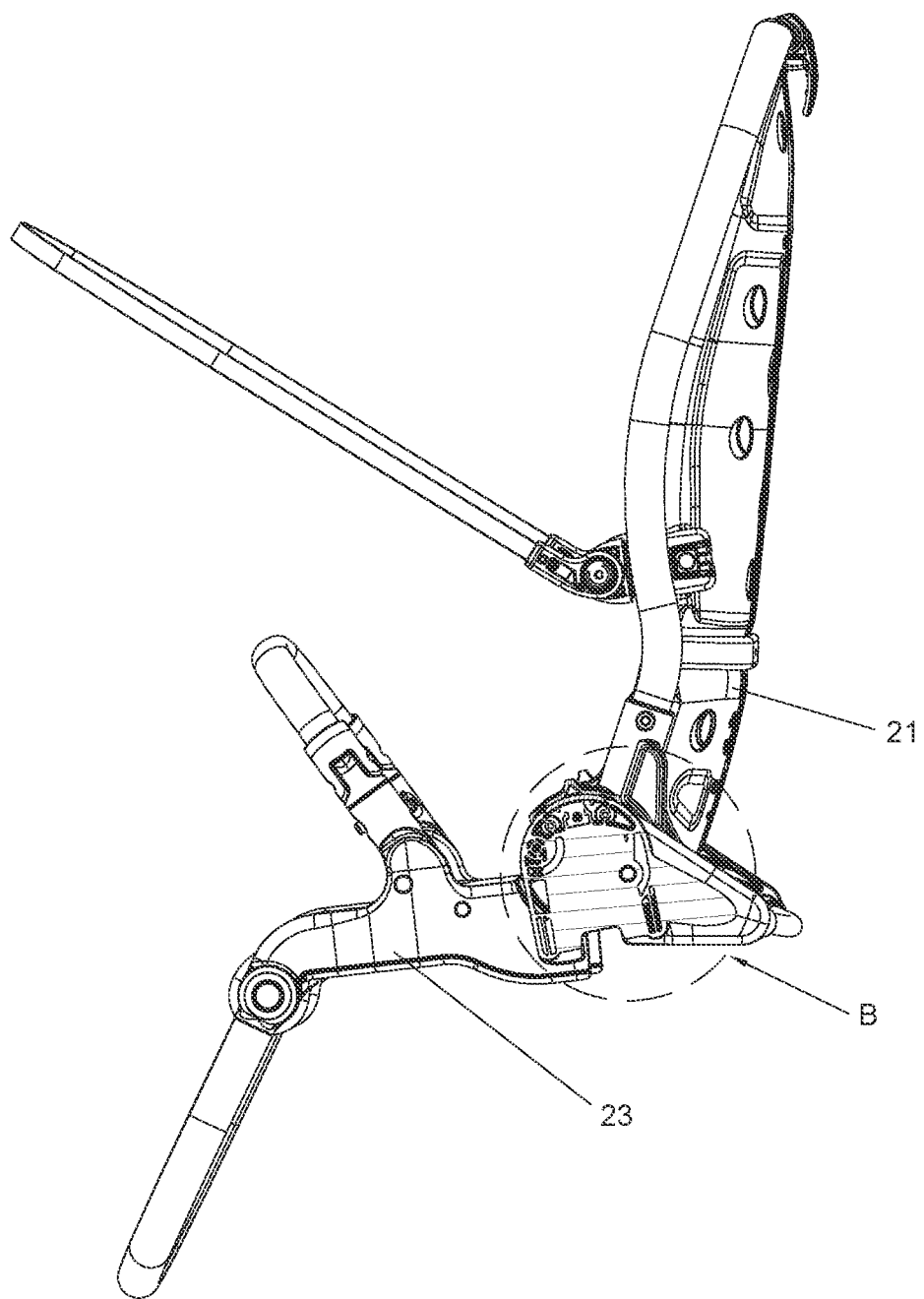
FIG. 5 is a cross-sectional view taken along cross-section K shown in FIG. 2.
Figure 6:
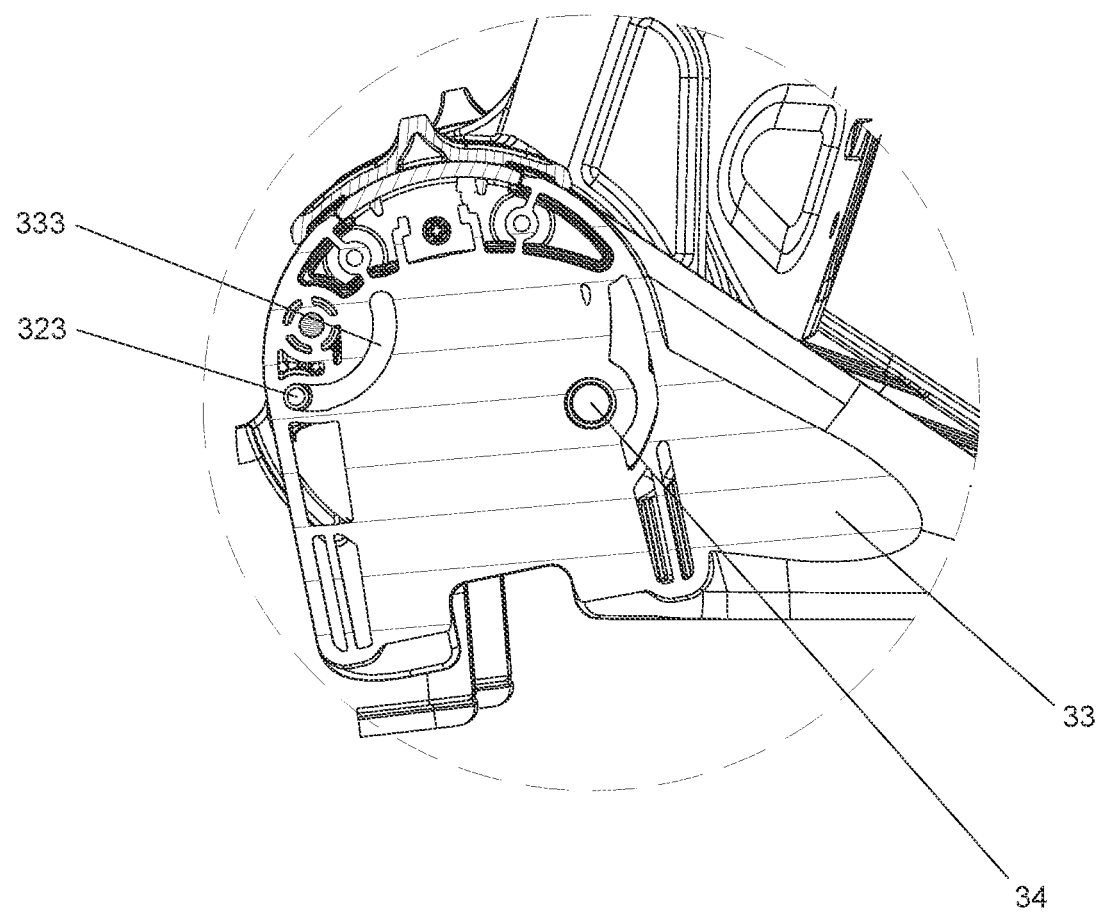
FIG. 6 is an enlarged view of portion B shown in FIG. 5.

Referring to FIGS. 5 and 6, the coupling part 33 can have a limiting slot 333 of an arcuate shape, and the second joining part 32 can be fixedly connected with a pin 323 that is restricted to slide along the limiting slot 333. The limiting slot 333 can thereby delimit an angular displacement of the second joining part 32 and the seat portion 23 attached thereto relative to the coupling part 33.

Referring to FIGS. 2-14, the pivot joint 30 can include a latch 34 operable to lock the second joining part 32 and the seat portion 23 attached thereto with respect to the coupling part 33, thereby preventing rotation of the seat portion 23 relative to the coupling part 33. According to an example of construction, the latch 34 may be a pin that can project away from the first joining part 31 and extend between the second joining part 32 and the coupling part 33. The latch 34 can be carried with the second joining part 32, and is movable between a locking position engaged with the coupling part 33 and an unlocking position disengaged from the coupling part 33. For example, the latch 34 can engage with a locking opening 331 (better shown in FIG. 7) provided on an inner side of the coupling part 33 in the locking position, and can disengage from the locking opening 331 in the unlocking position. The latch 34 can be in the locking position when the stroller seat 20 is in a configuration of use (such as the sitting configuration shown in FIG. 17 or the recumbent configuration shown in FIG. 15), and in the unlocking position when the backrest portion 21 is folded over the seat portion 23 (e.g., as shown in FIG. 19).

The locking position of the latch 34 can prevent rotation of the second joining part 32 and the seat portion 23 attached thereto relative to the coupling part 33, but allow the first joining part 31 to rotate relative to the second joining part 32 and the coupling part 33 locked to each other. When the stroller seat 20 is installed on the stroller frame 10 with the coupling part 33 engaged with the seat mount 15, the locking position of the latch 34 can thus prevent rotation of the backrest portion 21 and the seat portion 23 relative to the stroller frame 10, whereas the backrest portion 21 may be rotated relative to the seat portion 23 and the coupling part 33 for adjustment to a desired configuration of use (such as the sitting configuration shown in FIG. 17 or the recumbent configuration shown in FIG. 15).

The latch 34 can be switched from the locking position to the unlocking position when the backrest portion 21 is folded over the seat portion 23, whereby the seat portion 23 and the backrest portion 21 folded thereon can rotate relative to the coupling part 33 for collapsing the folded backrest portion 21 and seat portion 23 on the stroller frame 10.

The pivot joint 30 can further include a linking mechanism configured to movably couple the latch 34 to the first joining part 31 so that a rotation of the backrest portion 21 relative to the seat portion 23 in a folding direction causes the latch 34 to disengage from the coupling part 33, and a rotation of the backrest portion 21 relative to the seat portion 23 in an unfolding direction causes the latch 34 to engage with the coupling part 33. An example of construction for the linking mechanism that movably couples the latch 34 to the backrest portion 21 is better illustrated in FIGS. 8-14.

Referring to FIGS. 8-14, the linking mechanism can include a driving part 35 carried with the second joining part 32. The driving part 35 is connected with the latch 34 and movably linked to the first joining part 31. According to an example of construction, the driving part 35 can be fixedly connected with a pin 351 extending through an elongate slot 321 (better shown in FIG. 14) provided in the second joining part 32, whereby the driving part 35 can be slidably connected with the second joining part 32. The pin 351 is restricted to slide along the elongate slot 321, which can limit a sliding movement of the driving part 35 relative to the second joining part 32. Moreover, the pin 351 can have an end portion that is slidably received in a channel 311 provided on the first joining part 31. According to an example of construction, the channel 311 of the first joining part 31 can have a generally U-shape or generally V-shape. During operation, rotation of the first joining part 31 relative to the second joining part 32 can result in the pin 351 sliding along the channel 311 relative to the first joining part 31, which causes the driving part 35 to slide relative to the first joining part 31 and the second joining part 32. The driving part 35 can be thereby movably coupled to the backrest portion 21, and can slide generally parallel to the first joining part 31 and the second joining part 32.

Referring to FIGS. 9-14, the driving part 35 can have a cavity 353 for passage of the latch 34. The latch 34 can be disposed for sliding relative to the driving part 35 through the cavity 353 along an axis of movement Y, which is substantially parallel to the pivot axis defined by the pivot axle 36 that couples the second joining part 32 to the coupling part 33. Moreover, the driving part 35 can have a guide slot 355 provided on a sidewall of the cavity 353 that is tilted an angle relative to the axis of movement Y of the latch 34, and the latch 34 can have a lateral protrusion 341 slidably connected with the guide slot 355. According to an example of construction, two guide slots 355 may be symmetrically provided on two opposite sidewalls of the cavity 353, and the latch 34 can have two lateral protrusions 341 respectively connected slidably with the two guide slots 355. Owing to the sliding connection between the lateral protrusion 341 and the guide slot 355, the driving part 35 is movable to drive the latch 34 to slide along the axis of movement Y so that the latch 34 can protrude outside the cavity 353 of the driving part 35 for engaging with the coupling part 33 or retract toward the cavity 353 of the driving part 35 for disengaging from the coupling part 33.

According to an example of construction, the pivot joint 30 may further include a metal plate (not shown) affixed to second joining part 32 for reinforcing the connection between the second joining part 32 and the coupling part 33. The metal plate may be positioned between the second joining part 32 and the coupling part 33.

FIGS. 15-20 are various views illustrating the stroller seat 20 in different configurations and corresponding states of the latch 34 and the driving part 35. In use, the latch 34 can be engaged with the coupling part 33 when the stroller seat 20 installed on the stroller frame 10 is in a configuration of use for receiving a child, e.g., in the sitting configuration shown in FIG. 17 or the recumbent configuration shown in FIG. 15. When the backrest portion 21 is adjusted between the different configurations of use (e.g., between the sitting configuration shown in FIG. 17 and the recumbent configuration shown in FIG. 15), the pin 351 of the driving part 35 can slide along the channel 311 of the first joining part 31, and the latch 34 can remain in the locking position engaged with the coupling part 33.

When the backrest portion 21 is folded over the seat portion 23, the driving part 35 can be driven in movement by the first joining part 31 and urge the latch 34 to disengage from the coupling part 33. For example, the latch 334 can be disengaged from the coupling part 33 when the backrest portion 21 is in the folded configuration shown in FIG. 19. Once the latch 334 is disengaged from the coupling part 33, the backrest portion 21 and the seat portion 23 folded over each other can rotate downward as a unit relative to the coupling part 33 to a collapse configuration, which can displace the latch 34 away from the locking opening 331 of the coupling part 33. The collapse configuration thereby obtained can provide a compact form for facilitating storage and transport.

The aforementioned collapse configuration of the stroller seat 20 can be achieved when the stroller seat 20 is installed on the stroller frame 10 in a forward facing position or a rearward facing position, and can similarly offer a compact form for storage and transport. Moreover, the stroller seat 20 may be folded and collapsed while the stroller frame 10 supporting the stroller seat 20 remains in an unfolded state, which can offer more folding flexibility.

When the stroller seat 20 is unfolded for use, the seat portion 23 can be reversely rotated relative to the coupling part 33 so that the latch 34 becomes aligned with the locking opening 331. Then the backrest portion 21 can be unfolded relative to the seat portion 23, whereby the driving part 35 can be driven in movement by the first joining part 31 and urge the latch 34 to engage with the coupling part 33.

Rather than the linking mechanism described previously, some alternate embodiments may provide an actuating portion (not shown) protruding outward from the coupling part 33, wherein the actuating portion is operable to cause the latch 34 to slide and disengage from the coupling part 33. According to some other examples of construction, a cable (not shown) may be provided for directly pulling the latch 34 to disengage from the coupling part 33.

Figure 7:
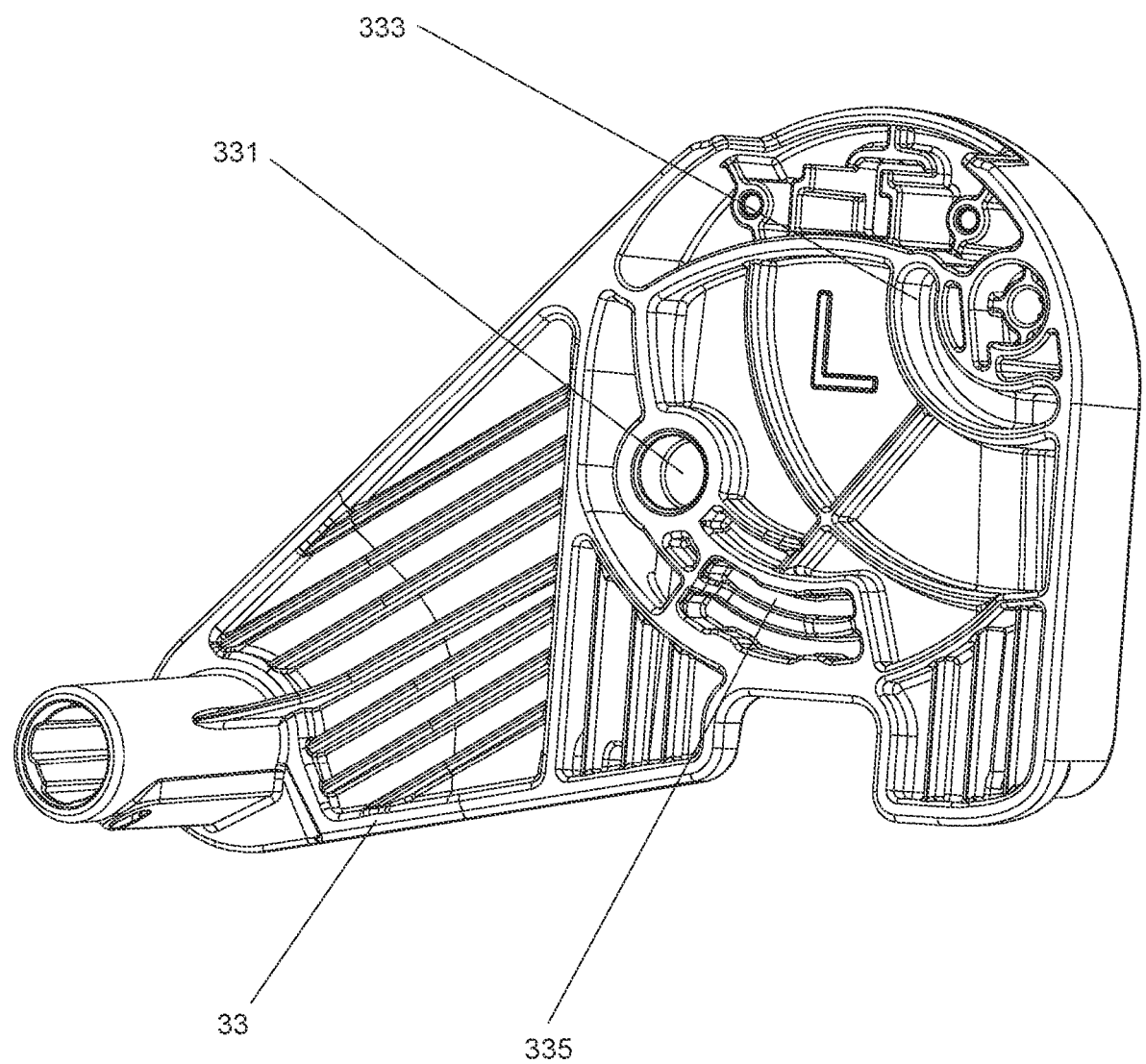
FIG. 7 is a perspective view illustrating the coupling part provided in the stroller seat.
Figure 8:
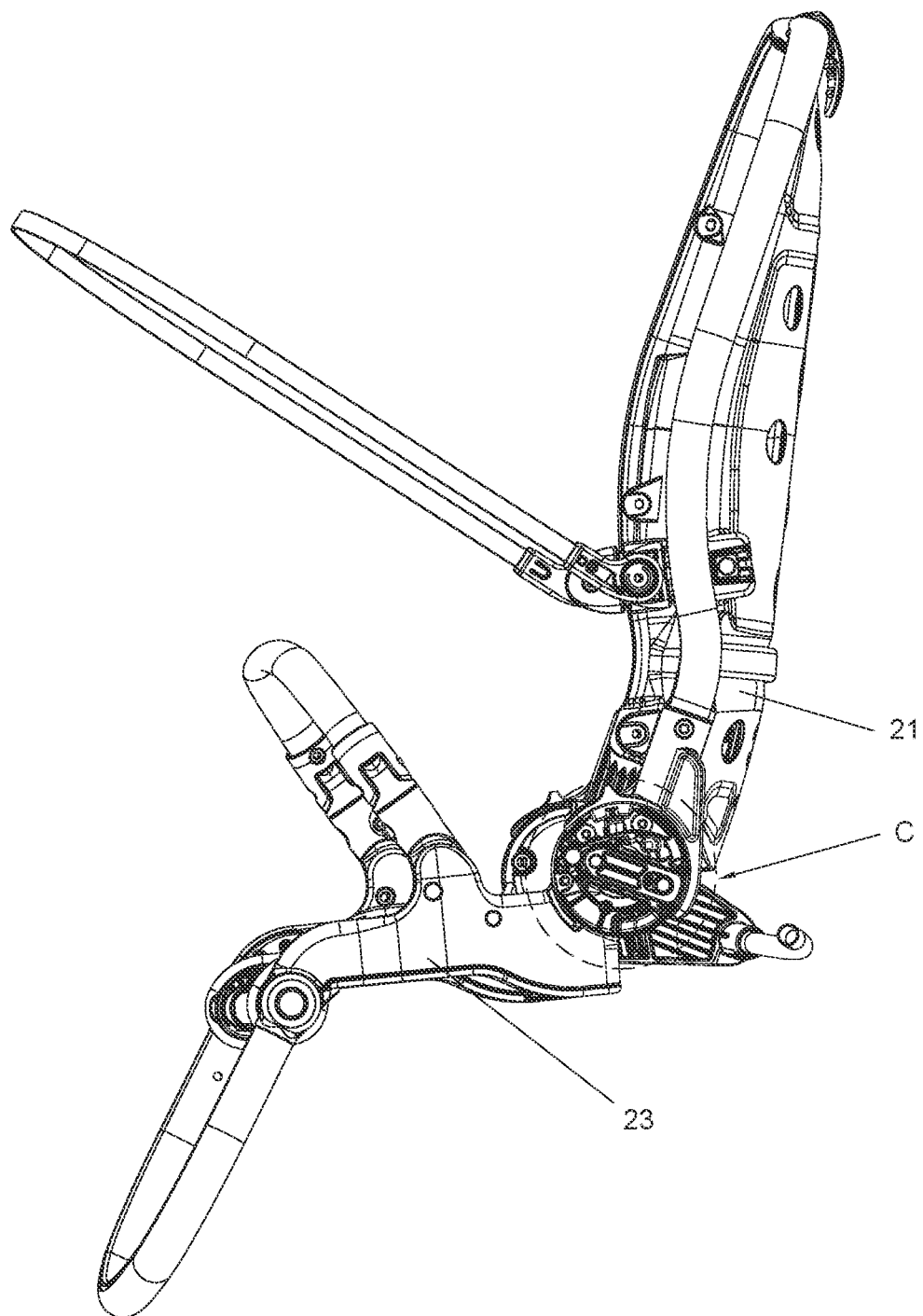
FIG. 8 is a perspective view illustrating some construction details of the stroller seat.
Figure 9:
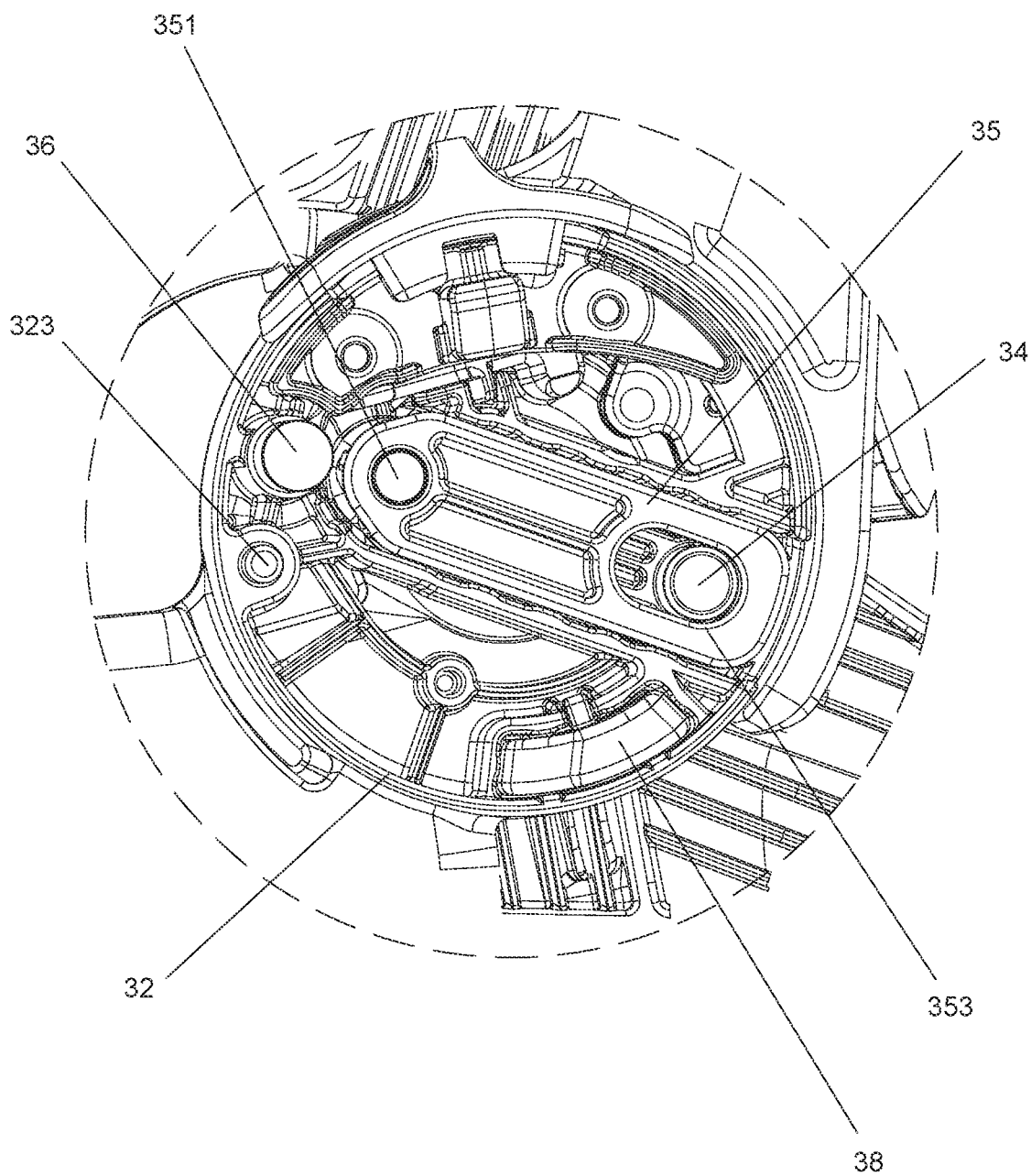
FIG. 9 is an enlarged view of portion C shown in FIG. 8.
Figure 10:
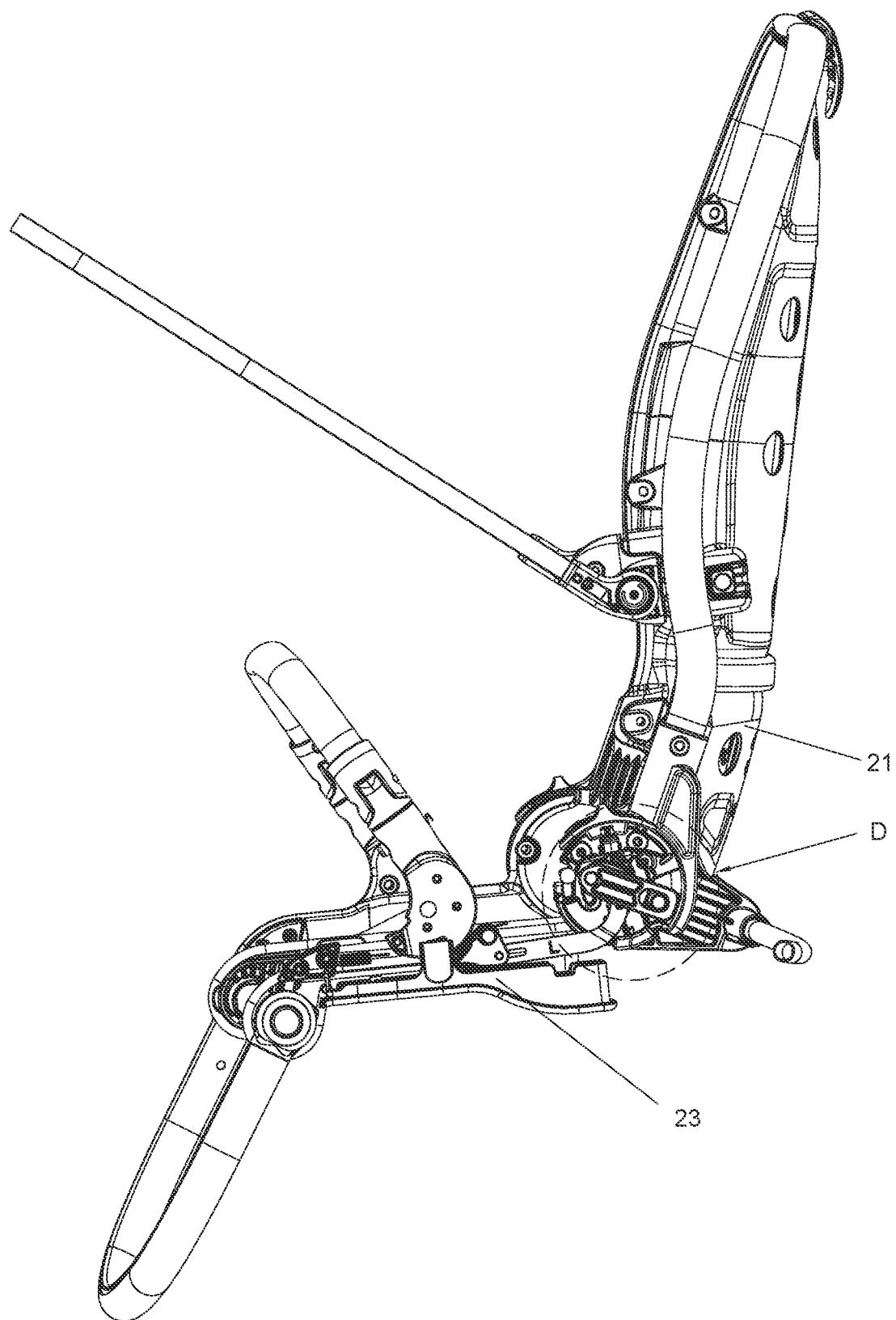
FIG. 10 is a perspective view illustrating further construction details of the stroller seat.
Figure 11:
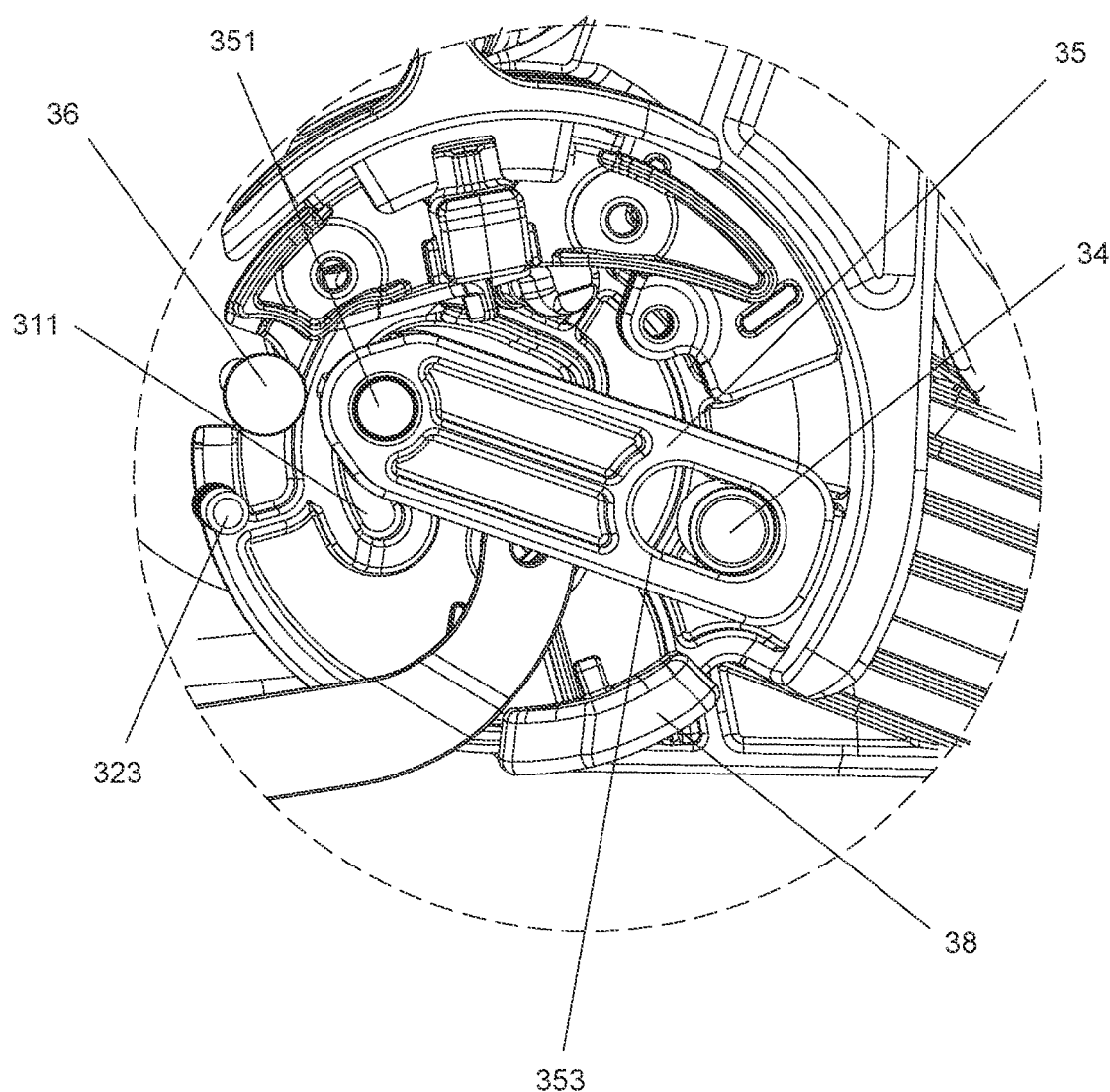
FIG. 11 is an enlarged view of portion D shown in FIG. 10.
Figure 12:
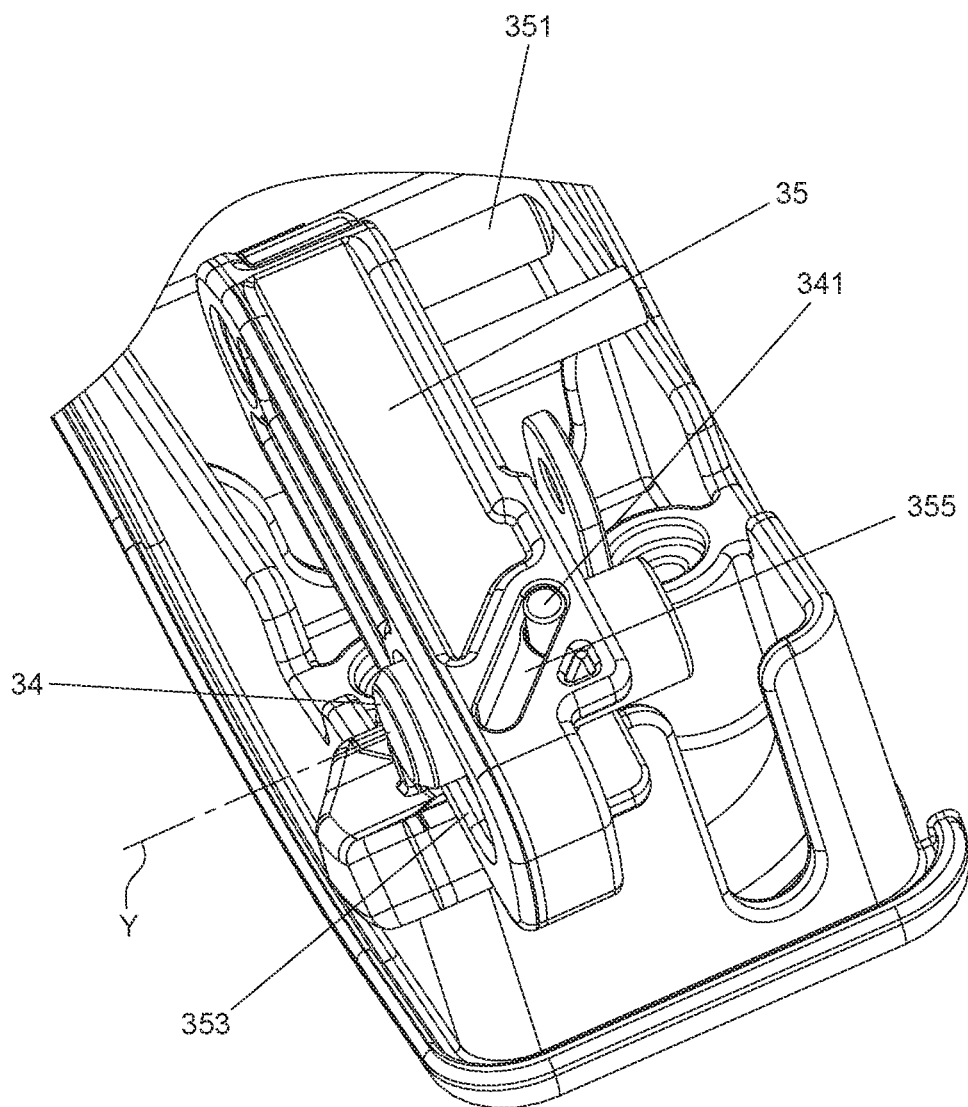
FIG. 12 is a perspective view illustrating a portion of a linking mechanism that movably couples a backrest portion of the stroller seat to a latch used for locking a seat portion of the stroller seat to the coupling part.
Figure 13:
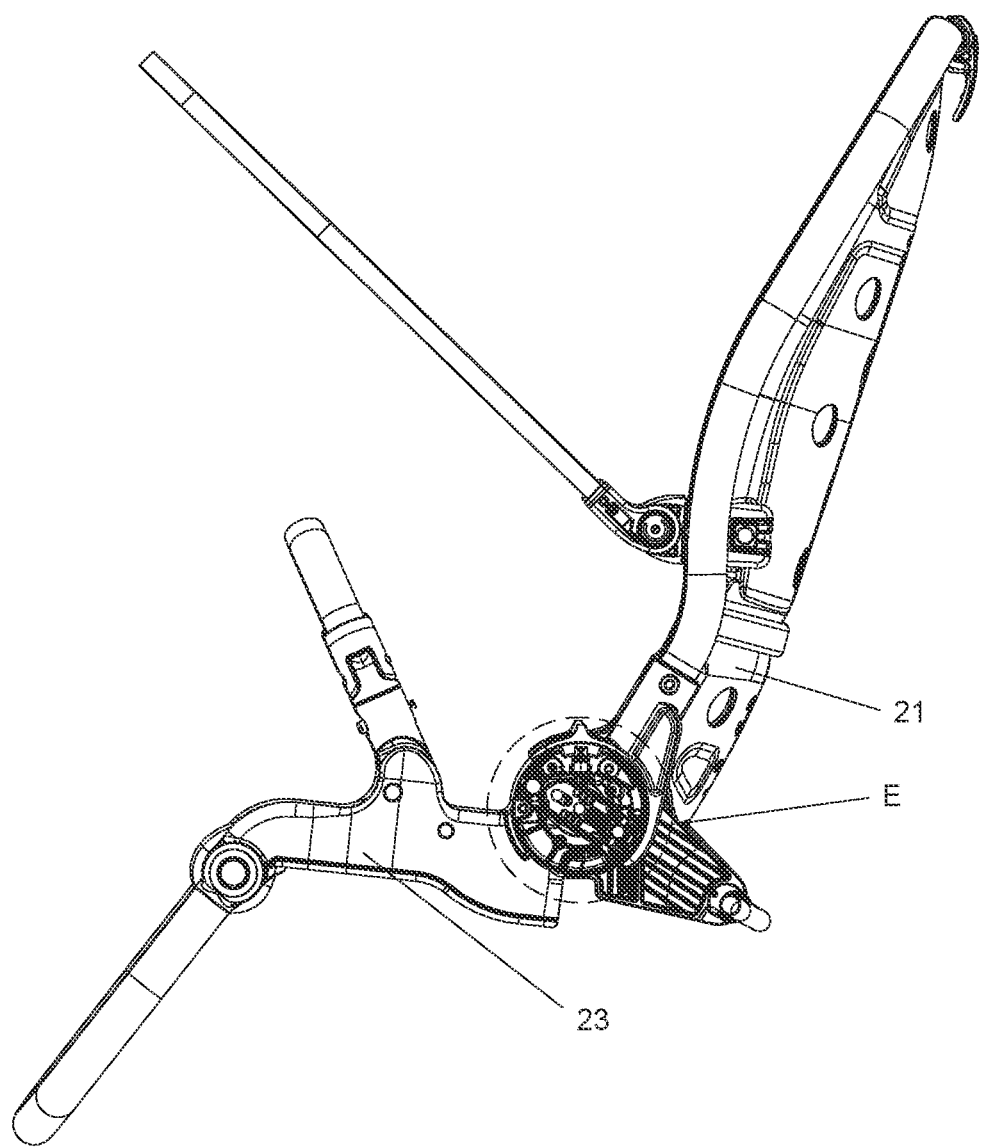
FIG. 13 is a side view illustrating further construction details of the stroller seat.
Figure 14:
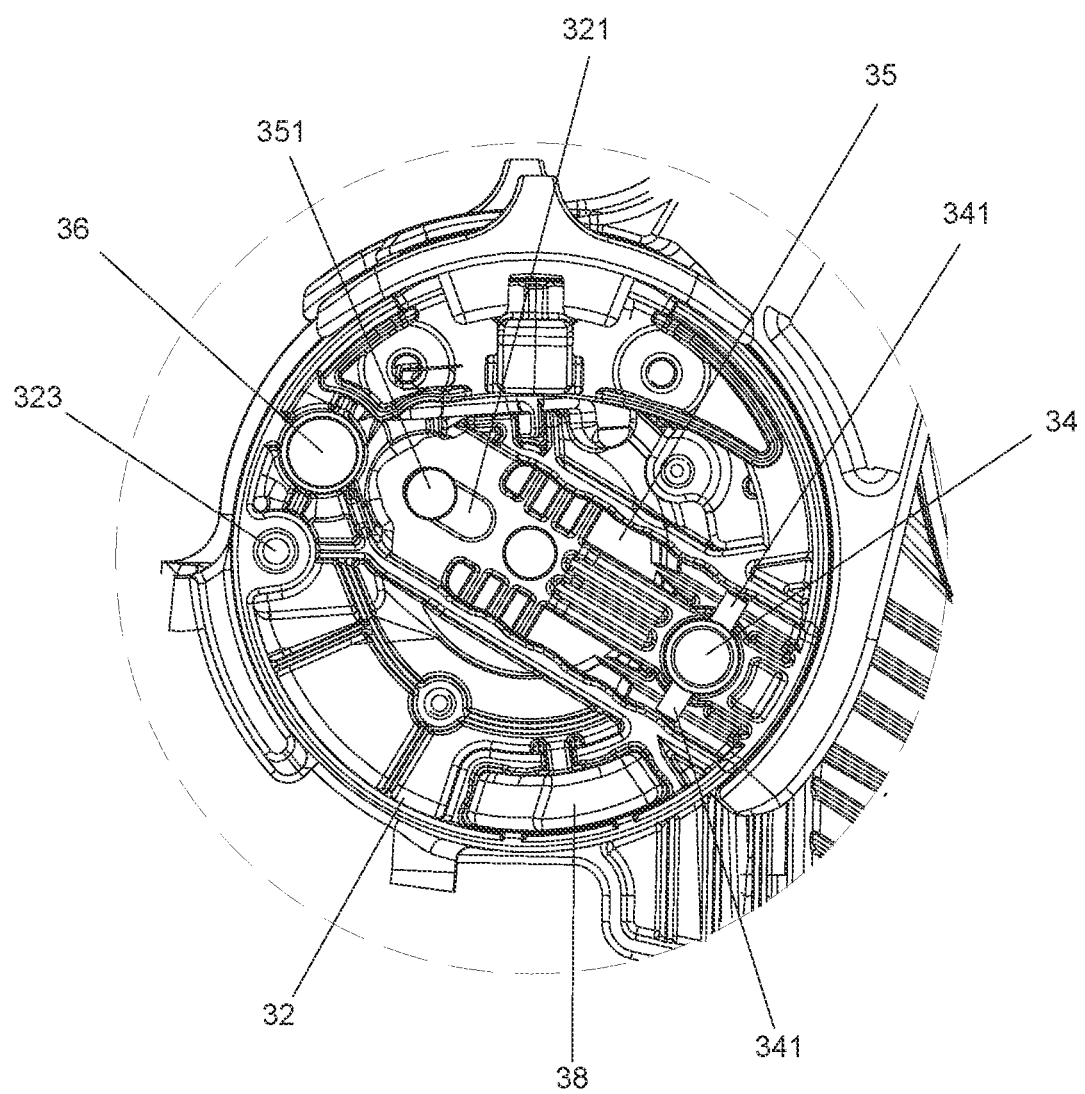
FIG. 14 is an enlarged view of portion E shown in FIG. 13.

Referring to FIGS. 7 and 9, the pivot joint 30 can further include an impeding part 38 configured to resist against downward rotation of the seat portion 23 relative to the coupling part 33 toward the collapse configuration, while the latch 34 is in the unlocking position. For example, the impeding part 38 may be carried with the second joining part 32, and can engage with the coupling part 33 to resist against downward rotation of the seat portion 23 toward the collapse configuration. The impeding part 38 is operable independent of the latch 34. According to an example of construction, the impeding part 38 may be slidably connected with the second joining part 32, and can be biased by a spring force to engage with a depression 335 (better shown in FIG. 7) provided on the inner side of the coupling part 33. For example, a spring (not shown) connected with the impeding part 38 and the second joining part 32 may provide a biasing force that urges the impeding part 38 in frictional contact with the depression 335 of the coupling part 33.

The impeding part 38 can be engaged with the depression 335 of the coupling part 33 when the stroller seat 20 is unfolded for receiving a child (e.g., in the sitting configuration shown in FIG. 17 or the recumbent configuration shown in FIG. 15), and can remain in this engagement state when the backrest portion 21 is folded over the seat portion 23 (e.g., as shown in FIG. 19) and the latch 34 is switched to the unlocking position. While the latch 34 is in the unlocking position, the engagement of the impeding part 38 with the coupling part 33 may assist in keeping the seat portion 23 and the backrest portion 21 folded thereon in position relative to the coupling part 33 against gravity action.

For collapsing the folded backrest portion 21 and seat portion 23 relative to the coupling part 33, a caregiver can apply a downward force on the backrest portion 21 or the seat portion 23 to overcome the resistance created by the impeding part 38, which can force the impeding part 38 to retract toward the second joining part 32 and disengage from the depression 335 so that the folded backrest portion 21 and seat portion 23 can rotate downward relative to the coupling part 33 to the collapse configuration. The impeding part 38 can move along with the second joining part 32 and can be displaced away from the depression 335 as the folded backrest portion 21 and seat portion 23 rotate relative to the coupling part 33 to the collapse configuration. The stroller seat 20 can be thereby collapsed in a controlled manner.

When the stroller seat 20 is unfolded for use, the seat portion 23 can be reversely rotated relative to the coupling part 33 so that the impeding part 38 becomes aligned and engages with the depression 335. Then the backrest portion 21 can be unfolded relative to the seat portion 23, whereby the driving part 35 can be driven in movement by the first joining part 31 and urge the latch 34 to engage with the coupling part 33.

Advantages of the child stroller apparatus described herein include the ability to fold a stroller seat to a compact form for facilitating storage and transport. The stroller seat may be folded and collapsed while the stroller frame supporting the stroller seat remains in an unfolded state, which can offer more flexibility. Moreover, the child stroller apparatus may include an impeding part operable to ensure that the stroller seat can be collapsed in a controlled manner, which provides safer use.

Realization of the child stroller apparatus has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child stroller apparatus comprising:
a stroller frame; and
a stroller seat supportable by the stroller frame, wherein the stroller seat includes:
a backrest portion fixedly connected with a first joining part;
a seat portion fixedly connected with a second joining part that is pivotally connected with the first joining part;
a coupling part pivotally connected with the second joining part, the coupling part being adapted to connect with the stroller frame, wherein the second joining part is disposed between the first joining part and the coupling part;
a latch carried with the second joining part and movable between a locking position where the latch is engaged with the coupling part to prevent rotation of the seat portion relative to the coupling part, and an unlocking position where the latch is disengaged from the coupling part for rotation of the seat portion relative to the coupling part; and
a linking mechanism configured to movably couple the latch to the first joining part so that a rotation of the backrest portion relative to the seat portion in a folding direction causes the latch to disengage from the coupling part, and a rotation of the backrest portion relative to the seat portion in an unfolding direction causes the latch to engage with the coupling part.

2. The child stroller apparatus according to claim 1, wherein the linking mechanism includes a driving part carried with the second joining part, the driving part being connected with the latch and movably linked to the first joining part.

3. The child stroller apparatus according to claim 2, wherein the latch is disposed for sliding along an axis of movement, and the driving part is movably coupled to the backrest portion and is slidable along an axis that differs from the axis of movement of the latch.

4. The child stroller apparatus according to claim 2, wherein the first joining part includes a channel, and the driving part is slidably connected with the second joining part and is fixedly connected with a pin that is slidably received in the channel.

5. The child stroller apparatus according to claim 4, wherein the channel has a generally U-shape or generally V-shape.

6. The child stroller apparatus according to claim 2, wherein the driving part has a cavity, and the latch is disposed for sliding relative to the driving part through the cavity.

7. The child stroller apparatus according to claim 6, wherein the driving part has a guide slot provided on a sidewall of the cavity, and the latch has a lateral protrusion slidably connected with the guide slot, whereby the driving part is movable to drive the latch to slide so that the latch protrudes outside the cavity for engaging with the coupling part or retracts toward the cavity for disengaging from the coupling part.

8. The child stroller apparatus according to claim 1, further including an impeding part configured to resist against a rotation of the seat portion relative to the coupling part toward a collapse configuration while the latch is in the unlocking position.

9. The child stroller apparatus according to claim 8, wherein the impeding part is carried with the second joining part, and is operable to engage with the coupling part to resist against a rotation of the seat portion toward the collapse configuration.

10. The child stroller apparatus according to claim 9, wherein the impeding part is engaged with the coupling part when the stroller seat is unfolded for receiving a child, and remains engaged with the coupling part when the backrest portion is folded over the seat portion and the latch is switched to the unlocking position, the engagement of the impeding part with the coupling part being able to assist in keeping the seat portion and the backrest portion folded thereon in position against gravity action.

11. The child stroller apparatus according to claim 9, wherein the impeding part is biased by a spring force to engage with the coupling part.

12. A child stroller apparatus comprising:
a stroller frame; and
a stroller seat supportable by the stroller frame, wherein the stroller seat includes:
a backrest portion fixedly connected with a first joining part;
a seat portion fixedly connected with a second joining part that is pivotally connected with the first joining part;
a coupling part pivotally connected with the second joining part, the coupling part being adapted to connect with the stroller frame;
a latch slidable along an axis of movement between a locking position that prevents rotation of the seat portion relative to the coupling part, and an unlocking position for rotation of the seat portion relative to the coupling part; and
a linking mechanism configured to movably couple the latch to the first joining part so that a rotation of the backrest portion relative to the seat portion in a folding direction causes the latch to move from the locking position to the unlocking position, and a rotation of the backrest portion relative to the seat portion in an unfolding direction causes the latch to move from the unlocking position to the locking position;
wherein the linking mechanism includes a driving part that is connected with the latch and movably coupled to the first joining part of the backrest portion, the driving part being slidable along an axis that differs from the axis of movement of the latch.

13. The child stroller apparatus according to claim 12, wherein the latch and the driving part are carried with the second joining part, the latch being engaged with the coupling part in the locking position and disengaged from the coupling part in the unlocking position.

14. The child stroller apparatus according to claim 12, wherein the driving part is respectively connected slidably with the latch, the first joining part and the second joining part.

15. The child stroller apparatus according to claim 12, wherein the second joining part is disposed between the first joining part and the coupling part.

16. The child stroller apparatus according to claim 12, wherein the driving part has a cavity, and the latch is disposed for sliding relative to the driving part through the cavity.

17. The child stroller apparatus according to claim 16, wherein the driving part has a guide slot provided on a sidewall of the cavity, and the latch has a lateral protrusion slidably connected with the guide slot, whereby the driving part is movable to drive the latch to slide so that the latch protrudes outside the cavity for engaging with the coupling part or retracts toward the cavity for disengaging from the coupling part.

18. A child stroller apparatus comprising:
a stroller frame; and
a stroller seat supportable by the stroller frame, wherein the stroller seat includes:
a backrest portion fixedly connected with a first joining part;
a seat portion fixedly connected with a second joining part that is pivotally connected with the first joining part;
a coupling part pivotally connected with the second joining part and adapted to connect with the stroller frame, the seat portion being rotatable relative to the coupling part toward a collapse configuration;
a latch movable between a locking position that prevents rotation of the seat portion relative to the coupling part and an unlocking position for rotation of the seat portion relative to the coupling part; and
an impeding part operable independent of the latch to resist against a rotation of the seat portion relative to the coupling part toward the collapse configuration while the latch is in the unlocking position.

19. The child stroller apparatus according to claim 18, further including a linking mechanism configured to movably couple the latch to the first joining part so that a rotation of the backrest portion relative to the seat portion in a folding direction causes the latch to move from the locking position to the unlocking position, and a rotation of the backrest portion relative to the seat portion in an unfolding direction causes the latch to move from the unlocking position to the locking position.

20. The child stroller apparatus according to claim 18, wherein the latch is carried with the second joining part, the latch being engaged with the coupling part in the locking position and disengaged from the coupling part in the unlocking position.

21. The child stroller apparatus according to claim 18, wherein the impeding part is carried with the second joining part, and is operable to engage with the coupling part to resist against the rotation of the seat portion toward the collapse configuration.

22. The child stroller apparatus according to claim 21, wherein the impeding part is engaged with the coupling part when the stroller seat is unfolded for receiving a child, and remains engaged with the coupling part when the backrest portion is folded over the seat portion and the latch is switched to the unlocking position, the engagement of the impeding part with the coupling part being able to assist in keeping the seat portion and the backrest portion folded thereon in position against gravity action.

23. The child stroller apparatus according to claim 21, wherein the impeding part is biased by a spring force to engage with the coupling part.

24. The child stroller apparatus according to claim 21, wherein the impeding part is retractable toward the second joining part as the seat portion rotates toward the collapse configuration.

* * * * *